United States Patent [19]

Johnson

[11] Patent Number: 5,103,563

[45] Date of Patent: Apr. 14, 1992

[54] FOOD PREPARATION DEVICE

[76] Inventor: Carl W. Johnson, 4234 North 15th Ave., Phoenix, Ariz. 85015

[21] Appl. No.: 631,158

[22] Filed: Dec. 20, 1990

[51] Int. Cl.⁵ ................................................ B26B 3/00
[52] U.S. Cl. .................................... 30/301; 30/315; 30/316
[58] Field of Search ................ 30/301, 304, 305, 314, 30/315, 316, 299

[56] References Cited

U.S. PATENT DOCUMENTS

| | | | |
|---|---|---|---|
| 634,892 | 10/1899 | Jenks | 30/316 |
| 1,371,948 | 3/1921 | Szotz | 30/316 |
| 1,931,773 | 10/1933 | Sobol | 30/315 |
| 2,086,620 | 7/1937 | Hoffman | 30/315 |
| 2,799,929 | 7/1957 | Kurianski | 30/301 |
| 2,990,615 | 7/1961 | Ohler | 30/316 |
| 3,357,468 | 12/1967 | Brinch-Moller | |
| 3,363,311 | 1/1968 | Towers | 30/301 |
| 3,667,519 | 6/1972 | Shadduck | |
| 4,277,891 | 7/1981 | Dick | 30/316 |
| 4,397,425 | 8/1983 | Moore | |
| 4,457,070 | 7/1984 | Reeves | 30/314 |
| 4,681,000 | 7/1987 | Wolters | 30/301 |

Primary Examiner—Douglas D. Watts
Assistant Examiner—Hwei-Siu Payer
Attorney, Agent, or Firm—Terry M. Gernstein

[57] ABSTRACT

A food preparation device includes a plurality of teeth on a bottom rim of a hollow cylindrical body. Each of the teeth includes an apex that extends parallel to the longitudinal centerline of the device and two surfaces intersecting each other at the apex. In one form of the device, the surfaces are curved in one direction, in another form of the device, the surfaces are planar, and in a third form of the device, the surfaces are curved in three directions. Another form of the device includes a serrated cutting edge on the bottom rim.

5 Claims, 3 Drawing Sheets

FOOD PREPARATION DEVICE

TECHNICAL FIELD OF THE INVENTION

The present invention relates to the general art of food preparation, and to the particular field of chopping devices used in food preparation processes.

BACKGROUND OF THE INVENTION

Many recipes require food which is cut, chopped or diced. In order to prepare such food, many cooks use a variety of tools, such as knives or the like. However, each of these devices has the disadvantage of being slow and tedious. These devices can be tiring as well, especially if a great deal cutting or chopping is required, as when large quantities of food are being prepared.

Therefore, the art contains several powered devices, such as blenders and food processors that are intended to assist a cook in such food preparation. However, such powered devices can be expensive and cumbersome to use. These devices may also be difficult to clean with some of the blades also presenting a danger. If there are many small parts that are exposed to the cutting process, these parts also must be cleaned, thereby adding further difficulties to the cleanup process.

The art also contains a variety of hand-operated cutting devices. However, these hand-operated devices are often difficult to use and are not amenable to a wide variety of uses. For example, many of these devices are suitable only for cutting, while others are suitable only for slicing and so forth. In addition to the just-mentioned drawbacks, many of these hand-operated devices are also difficult to clean.

Many of these devices are fairly expensive, and may not last for great lengths of time, thus further increasing the cost thereof.

Accordingly, there is a need for a food preparation device that is suitable for a wide variety of cutting and chopping procedures, yet which is also easy to use and inexpensive to purchase while still being easy to clean.

OBJECTS OF THE INVENTION

The main object of the present invention is to provide a food preparation device that is suitable for a wide variety of cutting and chopping procedures.

It is another object of the present invention to provide a food preparation device that is suitable for a wide variety of cutting and chopping procedures, yet which is also easy to use and inexpensive to purchase.

It is another object of the present invention to provide a food preparation device that is suitable for a wide variety of cutting and chopping procedures, yet which is also easy to use and inexpensive to purchase while still being easy to clean.

SUMMARY OF THE INVENTION

These, and other, objects are achieved by a food preparation device that has a cutting and chopping means on one end of a cylindrical wall, with the cutting and chopping means including a plurality of cutting and chopping teeth on the wall adjacent to the lower rim of the wall. A rolled edge forming a handle is located on the top rim of the wall. The teeth of the cutting and chopping means are shaped to move cut food away from the remaining portions of the food thereby expediting the cutting and chopping process. Since the device is of simple design, it is easy to clean, use and maintain while being easy and inexpensive to manufacture. Therefore, the device can be sold at an inexpensive price.

BRIEF DESCRIPTION OF THE DRAWING FIGURES

DETAILED DESCRIPTION OF THE PREFERRED EMBODIMENT OF THE INVENTION

Figure 1:
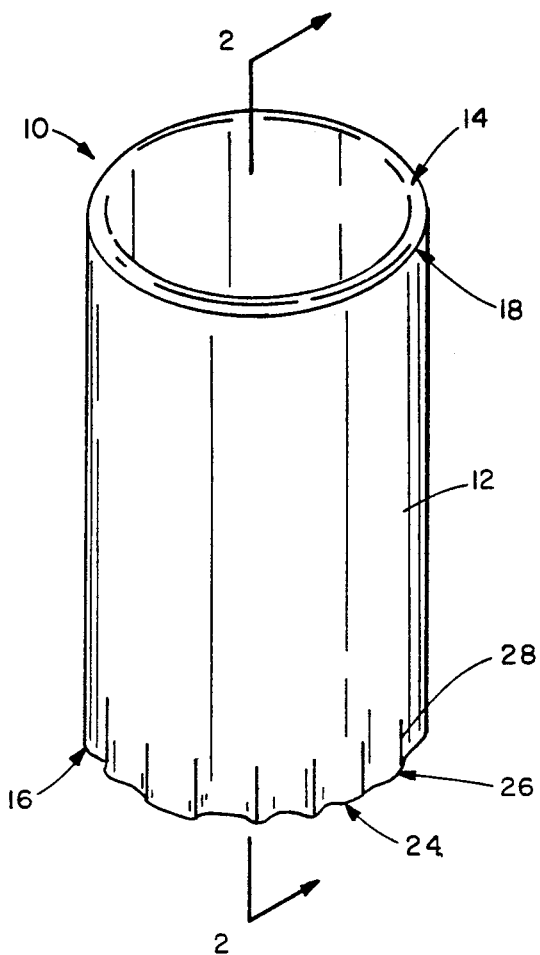
FIG. 1 is a top perspective view of a food preparation device embodying the present invention having arcuate cutting teeth on the lower rim thereof.
Figure 2:
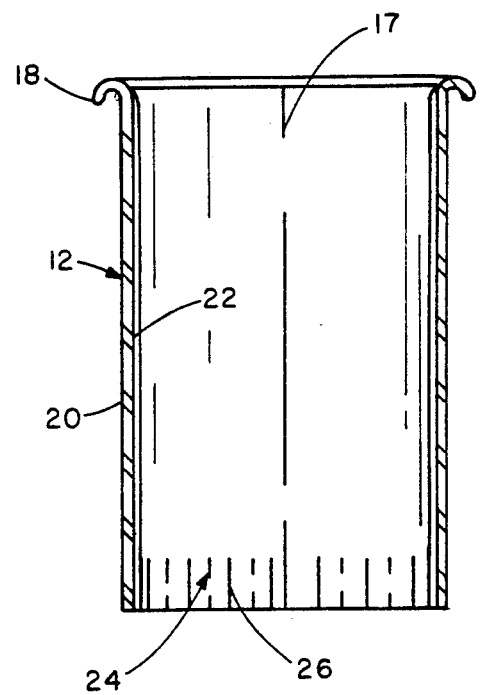
FIG. 2 is an elevational view of the FIG. 1 device taken along line 2—2 of FIG. 1.
Figure 3:
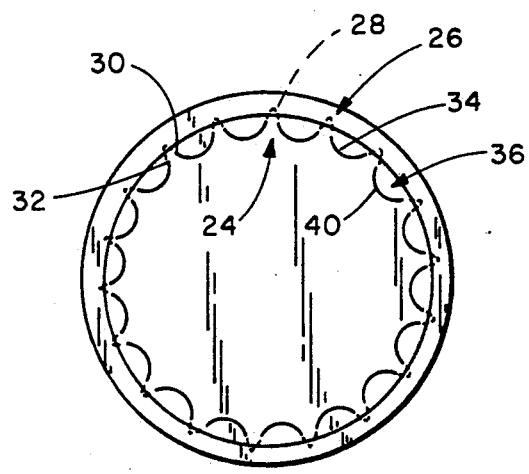
FIG. 3 is a top plan view of the FIG. 1 device.

Shown in FIGS. 1-3 is a food preparation device 10 representing a first form of the device of the present invention. The device 10 includes hollow cylindrical wall 12 having a top rim 14 and a bottom rim 16 with a longitudinal centerline 17 extending from the top rim to the bottom rim.

A rolled edge 18 extends radially outwardly from an outer surface 20 of the wall adjacent to the top rim and an inner surface 22 extends from the top rim to the bottom rim. A cutting and chopping means 24 is defined on the wall 12 adjacent to the bottom rim 16. The cutting and chopping means 24 has a plurality of identical triangular elements that are positioned and shaped to move food from one location to another with respect to the centerline 17. The overall device 10 is monolithic and one piece and thus is easy to handle, use, clean and maintain. The device is easy to manufacture and thus can be inexpensive to sell.

In the FIG. 1 form of the device, the cutting and chopping means includes a plurality of identical triangular teeth, such as tooth 26, having an apex, such as apex 28, with two arcuate surfaces, such as surfaces 30 and 32 intersecting at the apex and curving back toward the centerline 17. The apex extends parallel to the centerline 17 and is located within the perimeter of the rim 18. The curved surfaces 30 and 32 are curved to define a curved relief surface, such as surface 34, that connects adjacent surfaces 30 and 32 to define a concave cutting and relief area, such as area 36, between adjacent teeth. Each surface 34 has an innermost location, such as location 40, with the locations 40 of all surfaces 34 lying on a common circle centered on the centerline 17. The common center for the locations 40 provides uniformity of operation to the device.

The device 10 is used by simply grasping the rim 18 in the palm of a user's hand, and bringing the cutting and chopping means down onto the food. The food is cut and chopped, and the food removed from the main body thereof is forced toward or away from the centerline 17 or to the right or toward the left according to which part of the surface of the cutting and chopping means is in contact with the food. This separates the food. The device can be twisted about the centerline to further separate the cut and chopped food.

Figure 4:
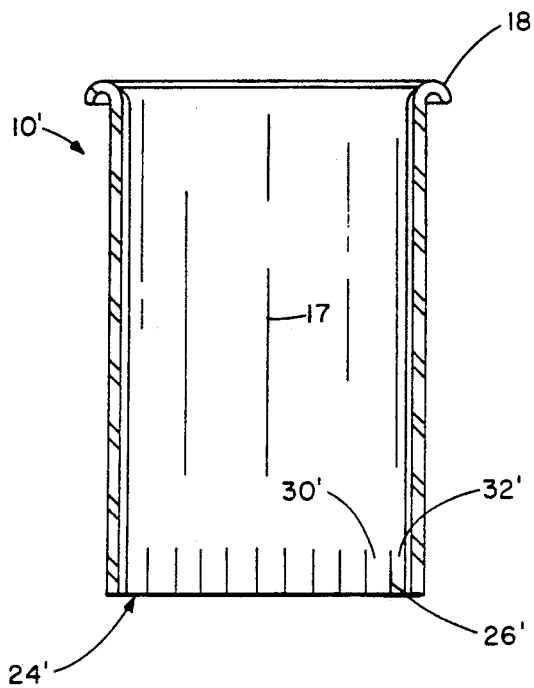
FIG. 4 is an elevational view similar to that shown in FIG. 2 of an alternative form of the device having triangular cutting teeth on the lower edge.
Figure 5:
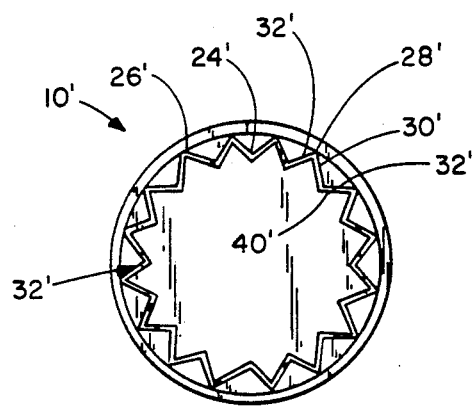
FIG. 5 is a top plan view of the FIG. 4 device.

A second form of the device is shown in FIGS. 4 and 5 as device 10'. The device 10' is similar to the device 10 in all respects except that the cutting and chopping means 24' of device 10'. The cutting and chopping means 24' includes a plurality of identical triangular teeth, such as tooth 26' having an apex 28' that extends parallel to the centerline 17 and is located within the perimeter of the rim 18. Two relief surfaces 30' and 32' intersect each other at each apex, and diverge away from each other towards the centerline 17. The relief surfaces 30' and 32' are planar. As shown in FIG. 5, the relief surfaces associated with one apex 28' diverge away from each other and intersect corresponding relief surfaces associated with an adjacent apex to form an inner apex 40' that corresponds to the innermost locations 40 of the device 10. The apexes 40' all lie on a common circle centered at the centerline 17. As is the case with the cutting and chopping means 24, the teeth extend from the lower rim toward the upper rim for ten per cent of the total length of the device as measured along the centerline 17 between the top rim and the bottom rim. The ten per cent fraction represents a compromise between manufacturing difficulty and cutting efficiency.

Use and operation of the device 10' is similar to the use and operation of the device 10, and thus will not be discussed.

Figure 6:
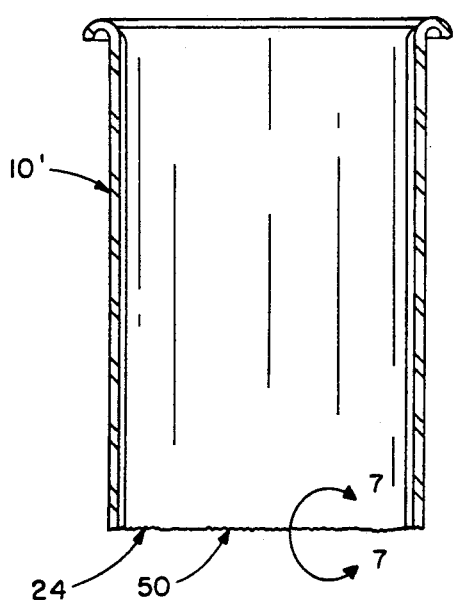
FIG. 6 is an elevational view similar to that shown in FIG. 2 of another alternative form of the device having a serrated lower edge.
Figure 7:
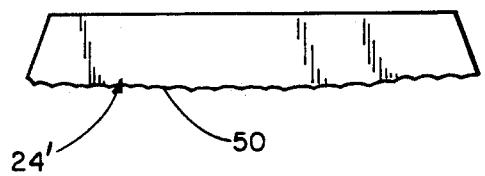
FIG. 7 is a view of a section of the serrated lower edge.

A third form of the device is shown in FIGS. 6 and 7 as device 10''. The device 10'' is similar to the devices 10 and 10' except that the cutting and chopping means 24'' thereof includes a serrated edge 50. The device 10'' is used in a manner similar to the manner discussed above, and the serrated edge 50 cuts and chops the food. The device 10'', like the devices 10 and 10', can be operated with a twisting motion about the centerline 17 in order to ensure full separation of the food.

Figure 8:
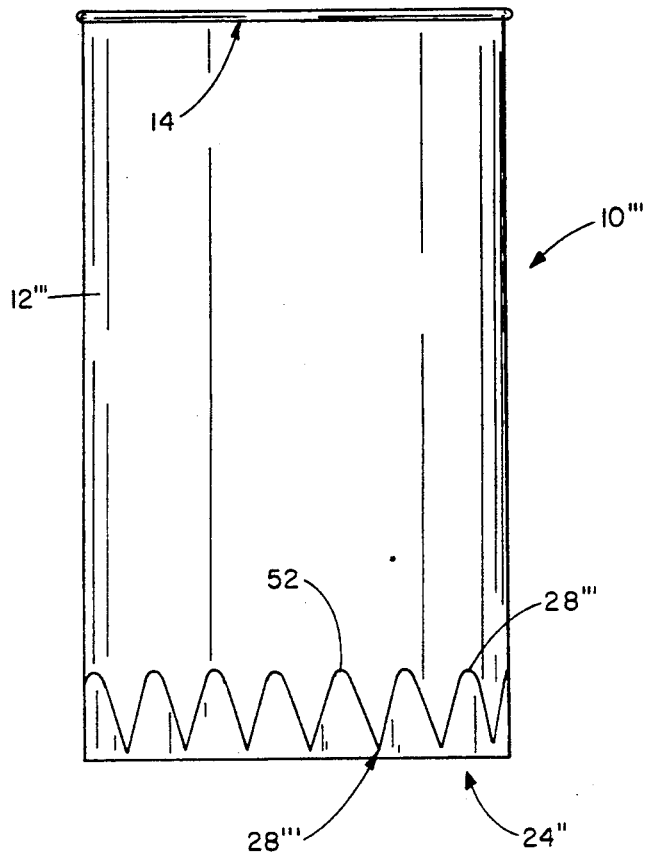
FIG. 8 is an elevational view similar to that shown in FIG. 2 of another alternative form of the device having a lower edge with a plurality of relief cutting elements.
Figure 9:
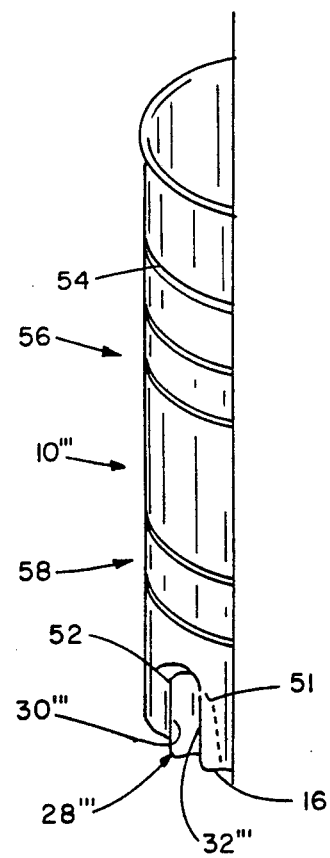
FIG. 9 is a partial top perspective view of the form of the device shown in FIG. 8.
Figure 10:
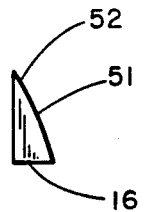
FIG. 10 is a view of one of the cutting elements of the FIG. 8 device.

Yet another form of the device is shown in FIGS. 8, 9 and 10 as device 10'''. The device 10''' is similar to the above-described devices, except that it includes a cutting and chopping means 24'' that includes a plurality of identical triangular teeth, such as tooth 26''' located immediately adjacent to the bottom rim 16 of the device 10'''. Each tooth 26''' includes an apex 28''' that extends for a fraction of the length of the apex 28 upward from the bottom rim parallel to the centerline 17. In the preferred form, this fraction is 1/10 whereby each apex 28''' extends from the lower rim toward the upper rim for one per cent of the total length of the centerline 17 between the top and bottom rims of the device 10'''. Each tooth further includes two angled arcuate surfaces 30'''' and 32'''' intersecting each other at the apex 28''' and diverging away from each other toward the centerline 17. The surfaces 30'''' and 32'''' also curve upward towards the top rim 14 as well, as indicated in FIG. 10 at curvature 51. The top plan view of the device 10''' is identical to the top plan view of device 10 shown in FIG. 3 since the elements are curved transversely in the same manner as the elements 24 of device 10. If the device 10''' has the rolled end 18 omitted, the apexes 28''' will be seen in full lines rather than the hidden lines shown in FIG. 3.

The surfaces 30'''' and 32'''' also have a third curvature that extends from a top apex 52 toward the apex 28''' in the outer surface of the wall 12'''. In this manner there is a triconcave surface formed adjacent to each apex. That is, the triconcave surface is defined by the three curvatures of each surface 30'''' and 32'''', one curvature being radially inward toward the centerline 17 (similar to the curvature shown in FIG. 3) and a second curvature being upward toward the top rim 14 (best shown in FIG. 10) and a third curvature being downwardly from the apex 52 toward the bottom rim of the device (best shown in FIG. 8).

The device 10''' also includes a plurality of circular grooves, such as groove 54 defined around the wall 12'''. The grooves provide a hand gripping means and are parallel to each other. The grooves 54 are spaced apart from each other along the centerline 17 and are formed in two groups, a top group 56 and a bottom group 58 so the device can be gripped in the most convenient location. Two separate groups of grooves are used so the entire surface need not be grooved, thereby creating a cleaning problem; however, enough grooves are provided so the user can obtain a firm grip on the device at any location on the device. The top group of grooves includes three grooves; whereas, the bottom group 58 includes two grooves. The bottom group includes fewer grooves since most users will grip the device from the top for better leverage. A rolled rim can also be included on the device 10''' if suitable in the manner of rim 18.

The use and operation of the device 10''' is similar to the use and operation of the above-described devices, and thus will not be presented.

It is understood that while certain forms of the present invention have been illustrated and described herein, it is not to be limited to the specific forms or arrangements of parts described and shown.

What is claimed is:

1. A food preparation device comprising:
A) a monolithic, one-piece hollow cylindrical body that includes a circular bottom rim and a circular top rim connected together by a cylindrical wall, with a longitudinal centerline extending from said bottom rim to said top rim centrally of said cylindrical body;
B) a cutting and chopping means on said bottom rim, said cutting and chopping means including a plurality of triangular teeth, each tooth including an apex that extends in a direction along said longitudinal centerline, said apexes extending from said bottom rim toward said top rim for one percent of the overall length of said wall measured between said bottom rim and said top rim, each tooth further including two side surfaces intersecting each other at each apex, each side surface diverging away from the other side surface towards said longitudinal centerline, each side surface intersecting a side surface associated with an adjacent tooth at an innermost location toward said longitudinal centerline, with all innermost locations associated with all of said plurality of teeth lying on a common circle that is centered on said longitudinal centerline, said side surfaces curving in three directions, including a first direction to be concave as viewed from outside said wall, a second direction from said top rim to said bottom rim to be concave as viewed from said bottom rim, and a third direction from said apex upwardly toward said top rim to be concave as viewed from said bottom rim.

2. The food preparation device defined in claim 1 wherein said apexes extend for less than one percent of the overall length of said wall as measured between said bottom rim and said top rim.

3. The food preparation device defined in claim 1 further including a plurality of parallel grooves defined in said wall and extending around said wall.

4. The food preparation device defined in claim 3 wherein said grooves are divided into two separate groups of grooves.

5. The food preparation device defined in claim 4 wherein one group of grooves includes three grooves and a second group of grooves includes two grooves, with said first group of grooves being located between said second group of grooves and said top rim.

* * * * *